(12) United States Patent
De Magalhaes

(10) Patent No.: US 8,688,743 B2
(45) Date of Patent: *Apr. 1, 2014

(54) PRESERVING AND HANDLING NATIVE DATA IN HYBRID OBJECT TREES

(75) Inventor: Arthur L. De Magalhaes, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,085

(22) Filed: Mar. 29, 2012

(65) Prior Publication Data

US 2013/0046794 A1 Feb. 21, 2013

Related U.S. Application Data

(63) Continuation of application No. 13/212,974, filed on Aug. 18, 2011.

(51) Int. Cl.
*G06F 7/00* (2006.01)
*G06F 17/30* (2006.01)

(52) U.S. Cl.
USPC ............ 707/797; 707/769; 717/144; 711/159

(58) Field of Classification Search
None
See application file for complete search history.

(56) References Cited

U.S. PATENT DOCUMENTS

| | | | |
|---|---|---|---|
| 7,117,216 B2 | 10/2006 | Chakraborty et al. | |
| 7,188,340 B2 * | 3/2007 | Ostertag et al. | 717/144 |
| 7,444,345 B2 | 10/2008 | Meadows | |
| 7,752,192 B2 | 7/2010 | Gu et al. | |
| 7,844,632 B2 | 11/2010 | Zhou et al. | |
| 7,853,884 B2 | 12/2010 | Olander et al. | |
| 2002/0194184 A1 | 12/2002 | Baskins et al. | |
| 2003/0172078 A1* | 9/2003 | Stumpf | 707/100 |
| 2004/0003348 A1* | 1/2004 | Ostertag et al. | 715/514 |
| 2008/0098186 A1* | 4/2008 | Zhou et al. | 711/159 |
| 2008/0141003 A1* | 6/2008 | Baker et al. | 712/220 |
| 2009/0210630 A1* | 8/2009 | Dimpsey et al. | 711/137 |
| 2010/0145902 A1 | 6/2010 | Boyan et al. | |

OTHER PUBLICATIONS

United States Patent and Trademark Office, Office Action for U.S. Appl. No. 13/212,974, Jan. 7, 2013, pp. 1-16, Alexandria, VA, USA.
United States Patent and Trademark Office, Office Action for U.S. Appl. No. 13/212,974, Jun. 6, 2013, pp. 1-20, Alexandria, VA, USA.

* cited by examiner

*Primary Examiner* — Loan T Nguyen

(74) *Attorney, Agent, or Firm* — Lee Law, PLLC; Christopher B. Lee

(57) ABSTRACT

A hybrid object tree that interconnects individual data objects of different data types from a group of different input data sources is provided. The instantiated data objects of the hybrid object tree include an internal dynamic data area that encapsulates at least one reference to an original input data source. At least one attribute is identified that is unavailable at the referenced original input data source of a first instantiated data object of the hybrid object tree. The at least one attribute is added to the first instantiated data object of the hybrid object tree within the internal dynamic data area of the first instantiated data object.

7 Claims, 10 Drawing Sheets

PRESERVING AND HANDLING NATIVE DATA IN HYBRID OBJECT TREES

RELATED APPLICATIONS

This application is a continuation of and claims priority to and claims the benefit of U.S. patent application Ser. No. 13/212,974 titled "PRESERVING AND HANDLING NATIVE DATA IN HYBRID OBJECT TREES," which was filed in the United States Patent and Trademark Office on Aug. 18, 2011, and which is incorporated herein by reference in its entirety.

BACKGROUND

The present invention relates to object trees. More particularly, the present invention relates to preserving and handling native data in hybrid object trees.

Elements or nodes within an object tree represent data objects of a "type" that are based upon a type of the object tree. For example, an extensible markup language (XML) document may be parsed into a document object model (DOM). A DOM is an XML object tree that represents XML data elements from the XML document as XML type data objects.

BRIEF SUMMARY

A method includes providing a hybrid object tree that interconnects individual data objects of different data types from a plurality of different input data sources, where instantiated data objects of the hybrid object tree comprise an internal dynamic data area that encapsulates at least one reference to an original input data source; identifying at least one attribute that is unavailable via the referenced original input data source of a first instantiated data object of the hybrid object tree; and adding the at least one attribute to the first instantiated data object of the hybrid object tree within the internal dynamic data area of the first instantiated data object.

A system includes a memory and a processor programmed to provide a hybrid object tree within the memory that interconnects individual data objects of different data types from a plurality of different input data sources, where instantiated data objects of the hybrid object tree comprise an internal dynamic data area that encapsulates at least one reference to an original input data source; identify at least one attribute that is unavailable via the referenced original input data source of a first instantiated data object of the hybrid object tree; and add the at least one attribute to the first instantiated data object of the hybrid object tree within the internal dynamic data area of the first instantiated data object.

A computer program product includes a computer readable storage medium including computer readable program code, where the computer readable program code when executed on a computer causes the computer to provide a hybrid object tree that interconnects individual data objects of different data types from a plurality of different input data sources, where instantiated data objects of the hybrid object tree comprise an internal dynamic data area that encapsulates at least one reference to an original input data source; identify at least one attribute that is unavailable via the referenced original input data source of a first instantiated data object of the hybrid object tree; and add the at least one attribute to the first instantiated data object of the hybrid object tree within the internal dynamic data area of the first instantiated data object.

DETAILED DESCRIPTION

Figure 1:
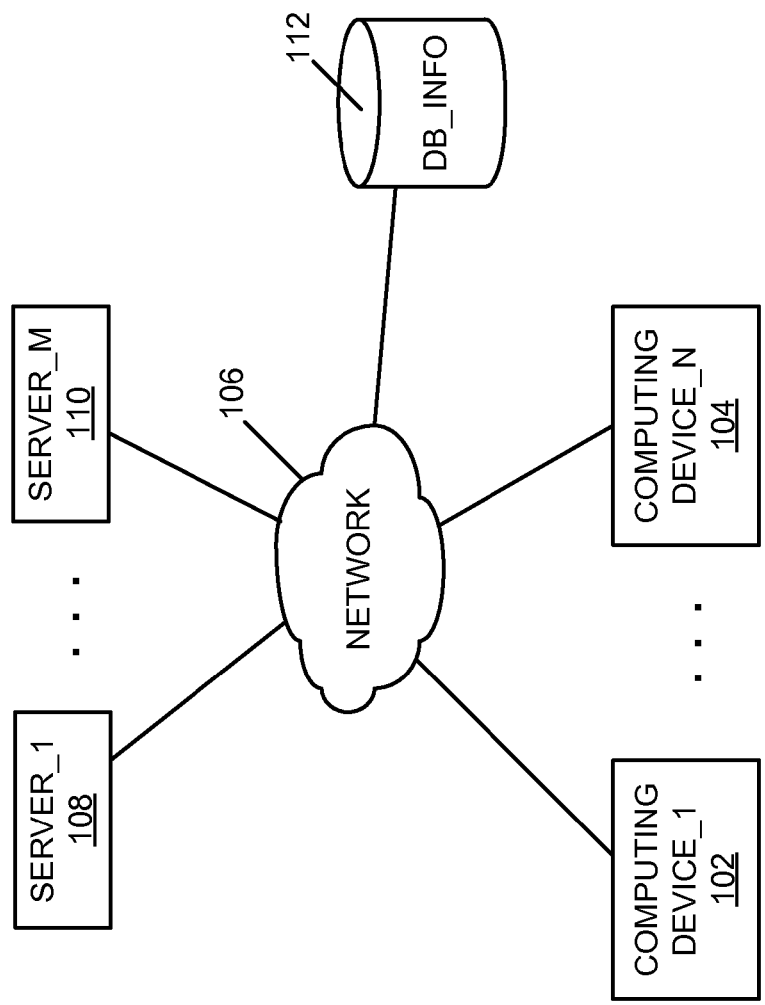
FIG. 1 is a block diagram of an example of an implementation of a system for automated creation, processing, augmentation, and management of hybrid object trees according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides for preserving and handling native data in hybrid object trees. The hybrid object trees described herein provide a variety of features that allow flexibility of data type for objects/nodes stored within the hybrid object trees, and allow dynamic augmentation of an object by attachment and expansion of attributes for an object that were not designed for nor a part of the original/native data type of the respective object(s). Further, the internal data held/referenced by hybrid nodes within a hybrid object tree may be exchanged or modified at any time (per the given implementation) and therefore the hybrid nodes described herein have the ability to dynamically morph their internal data type and attributes. As such, the hybrid object trees described here may be considered "dynamic hybrid object trees" in view of the internal data being dynamically modifiable, and the terms "hybrid object tree(s)" and "dynamic hybrid object tree(s)" are considered synonyms for the purpose of the present description. For example, the dynamic objects (nodes) of the dynamic hybrid object trees described herein may be natively populated by different types of data sources (e.g., original source data of a different "data type") and mixed within the same hybrid object tree. These different merged data formats/types may be dynamically expanded by the addition of attributes to further annotate the object/node. The original native data may be referenced/accessed and the original native data access methodology may be used for accessing the different nodes and the reference to the original native data may be changed over time. As such, the original native data of a different source may be incorporated into a hybrid object tree without copy operations or data duplication memory consumption and without requiring the creation of new data access methodologies, and the associations to source data may be changed over time. Further, separately accessible child data elements (e.g., discrete data values) may be represented within a hybrid object tree without requiring the creation of separate in-memory data objects. Accordingly, the hybrid object trees described herein allow the management of different types of objects from multiple native sources to be accessed and manipulated/mutated within the same hybrid object tree, and allow for the addition of distinct child data elements to the tree without the creation of separate in-memory data objects. Many other possibilities exist for the hybrid object trees described herein and all are considered within the scope of the present subject matter.

It should be noted that conception of the present subject matter resulted from recognition of certain limitations associated with conventional object trees. For example, it was recognized that conventional object trees are "type specific," in that conventional object trees require all data elements to be of the same data type. As such, data elements of different data types cannot be mixed within the same object tree unless additional separate interface or proxy objects are created and placed within the object tree. Further, conventional object trees require each object represented within the object tree to be fully instantiated data objects. If data objects from other trees are represented, they must be not only of the same data type, but must be copied into the object tree, which results in additional memory consumption within conventional object trees. Additionally, within conventional object trees, all nodes in a given tree are under the same object cache management. This limits storage and data access flexibility. Further, if an object is changed within a conventional object tree, such as by changing defined attributes, the object must be invalidated within the cache and re-instantiated with the new attributes.

The present subject matter improves these and additional aspects of object trees by providing a hybrid object tree that includes improved object referencing and processing, improved memory storage and consumption flexibility, improved attribute modification flexibility for instantiated objects, and data type diversification within the same hybrid object tree—all without the creation of additional separate interface or proxy objects. Accordingly, the present subject matter provides a hybrid object tree composed of natively managed nodes combined with the flexibility of further expanding the attributes of any of these nodes to provide functional and performance advantages over existing solutions.

The hybrid object trees that provide for preserving and handling native data are facilitated by the inclusion of an internal dynamic data area that defines specific "internalNodeData" fields in association with a given parent node of the hybrid object tree. The internalNodeData interacts with an attached child node by using a particular "mediator" that controls the flow of input data into a certain region of the hybrid object tree. For purposes of the examples herein, the internalNodeData represents an interface with a collection of interface methods. The following pseudo syntax represents one example of public interface for internalNodeData.

```
public interface InternalNodeData {
    public Mediator getMediator( );
    public void setMediator(Mediator mediator);
    public Object getAttribute(int fieldID);
    public void setAttribute(int fieldID, Object value);
    public Object getDynamicContainer( );
    public void setDynamicContainer(Object container);
}
```

A first method "getMediator" returns a reference to the mediator associated within the internalNodeData of a given object. A second method "setMediator" provides an ability to assign a mediator to a given object. A third method "getAttributes" returns any non-native or non-original attributes that have been added to an object. A fourth method "setAttributes" provides functionality to add non-native or non-original attributes to an object. A fifth method "getDynamicContainer" returns a reference to the container that encapsulates the dynamic attributes. A sixth method "setDynamicContainer" provides functionality to add a new container that encapsulates attributes accessible by the get/set Attribute methods. Other interface methods are possible for use in association with internalNodeData for objects of hybrid object trees and all are considered within the scope of the present subject matter.

Using the interface for the internalNodeData described above and in more detail below, whenever a node/object is accessed, the node makes an internal method call to the respective method of the internalNodeData to obtain the associated mediator (e.g., "getMediator"). Data elements of the object may then be accessed using the returned mediator reference.

By use of the present subject matter, the interaction of a node (or region of nodes) and the native input data is not controlled by the hybrid object tree. In contrast, it is controlled by the internalNodeData/Mediator pertaining to that specific node or region of nodes. This allows a given hybrid object tree to contain or reference nodes that are populated from many different sources while retaining their native input data and native behavior (e.g., lazy skipping, fast access, etc.). These native data source and native access methodologies/ behaviors may be exploited during serialization. The present subject matter further provides attribute flexibility by allowing extra fields to be dynamically added and set for any objects/nodes of the hybrid object tree. For example, if a node is originally generated by a non-schema aware parser (e.g., without an element declaration and post schema validation infoset (PSVI)), these attributes may be dynamically added to the internalNodeData of the node, even though its native internalNodeData does not support or manage of such fields.

As described above and in more detail below, the present subject matter allows for foreign object/node insertion and attachment to an object tree in a native form of the foreign object/node, with its original native data and with retention of its native behavior. The present subject matter also allows dynamic change of data/behavior and dynamic expansion of attribute storage. Hybrid nodes may be dynamically added into the same tree (or the native behavior of nodes may be swapped). Attributes and properties within any given node may be dynamically updated and stored. Incoming nodes do not need to be converted from different sources prior to insertion into a hybrid object tree. The processing for the addition of a node is hidden away into a field called "internalNodeData" and a mediator component manages node data access.

A node type may be changed over time, and as such does not have a fixed definition when created. Nodes may be created as a separate node within an object tree and the node type and native data load aspects are hidden (e.g., abstracted) within the internalNodeData and mediator abstraction layers of the node. Storage may be exchanged with other nodes via swapping of internalNodeData.

The internalNodeData fields may be attached to any node. As such, the internal node data may be attached, detached, and replaced for any node at any time. As such, non-native/non-original attributes and properties to be dynamically associated with a node may be stored for any node within a hybrid object tree.

The mediator layer abstraction allows various nodes to have different data types, as specified by the internalNodeData as the node's personalized dynamic storage. However, it should be noted that multiple nodes may share the same mediator if loading the same type of data, as appropriate for a given implementation.

It should be noted that the term "object" and "node," in both the singular and plural, may used interchangeably herein. Further, as described in more detail below, child nodes may be added to parent objects within a data area of the internalNodeData of a respective instantiated parent object without instantiating the respective child node as an actual in-system object that includes behavior and an encapsulated internalNodeData area. As such, in such a circumstance, the term "node" may represent a child element of a particular instantiated parent object without requiring instantiation of the particular child node.

Objects that are added to a hybrid object tree may be of a type that is completely different from the other type(s) of objects already associated within the hybrid object tree. Further, the phrase "instantiated data object" refers to an in-memory operational data element that provides at least one of data and behavior within an operational system. The term "instantiation" refers to an act of creating an instantiated data object within a memory.

Operations associated with preserving and handling native data in hybrid object trees described herein may be performed in real time to allow prompt management of objects of different types and complexity within a single hybrid object tree. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated creation, processing, augmentation, and management of hybrid object trees that preserve and handle native data. A computing_device_1 102 through a computing_device_N 104 communicate via a network 106 with a server_1 108 through a server_M 110. A database 112 stores information (DB Info) for use within the system 100.

As will be described in more detail below in association with FIG. 2 through FIG. 7, the computing_device_1 102 through the computing_device_N 104 and the server_1 108 through the server_M 110 may each provide automated creation, processing, augmentation, and management of hybrid object trees that preserve and handle native data. The automated creation, processing, augmentation, and management of hybrid object trees that preserve and handle native data is based upon building a hybrid object tree that includes data objects/nodes of different data types that retain their native original source data within its original storage location, and that may have attributes added that are not supported by the original data type or object/node. The automated creation, processing, augmentation, and management of hybrid object trees that preserve and handle native data provides improved association and access of objects of different types within a single hybrid object tree.

It should be noted that any of the computing_device_1 102 through the computing_device_N 104 and the server_1 108 through the server_M 110 may be a portable computing device, either by a user's ability to move the respective device to different locations, or by the device being association with a portable platform, such as a plane, train, automobile, or other moving vehicle. It should also be noted that the computing_device_1 102 through the computing_device_N 104 and the server_1 108 through the server_M 110 may be any computing device capable of processing information as described above and in more detail below. For example, the respective devices may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may additionally include any device capable of providing data for consumption by a device, such as the computing_device_1 102 through the computing_device_N 104, via a network, such as the network 106. As such, the server_1 108 through the server_M 110 may each include a web server, application server, or other data server device.

Figure 2:
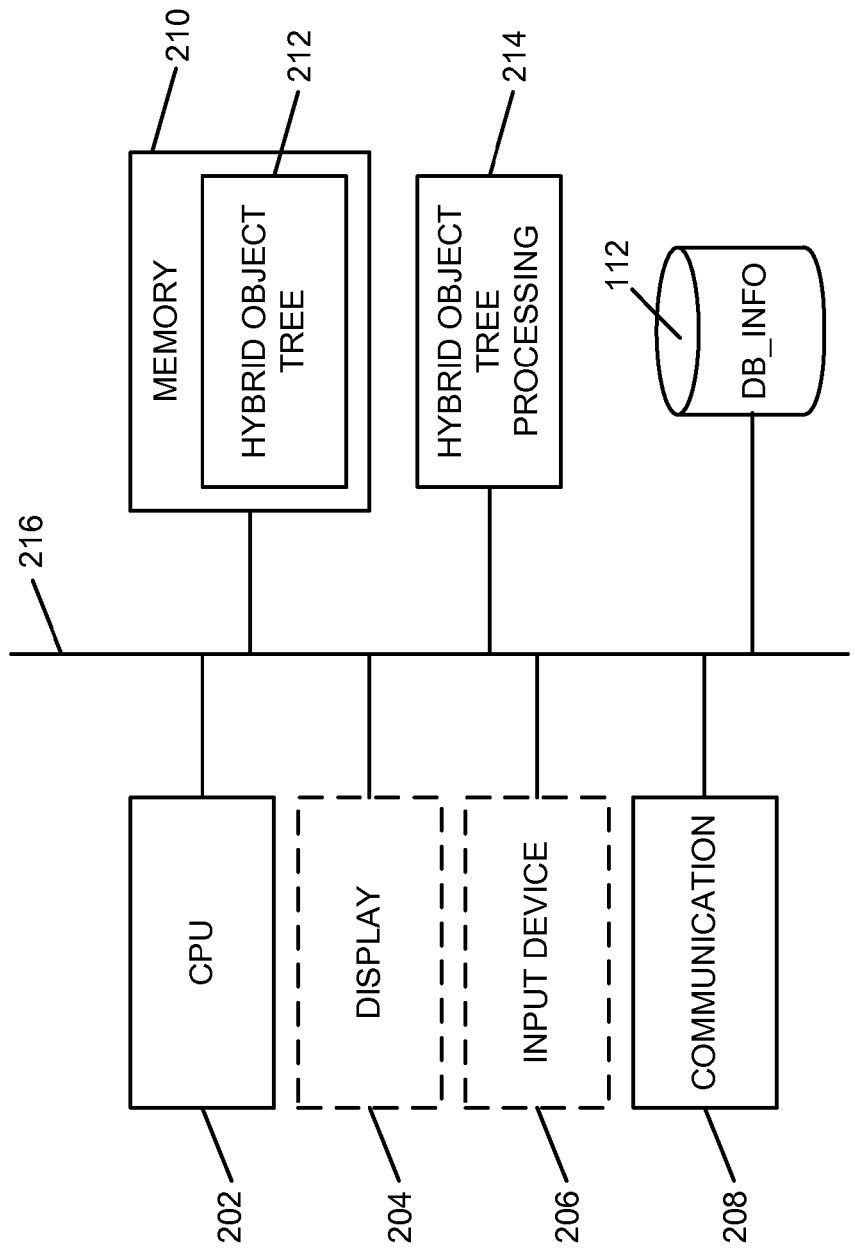
FIG. 2 is a block diagram of an example of an implementation of a core processing module capable of performing automated creation, processing, augmentation, and management of hybrid object trees according to an embodiment of the present subject matter.

FIG. 2 is a block diagram of an example of an implementation of a core processing module 200 capable of performing automated creation, processing, augmentation, and management of hybrid object trees that preserve and handle native data. The core processing module 200 may be associated with either the computing device_1 102 through the computing device_N 104 or the server_1 108 through the server_M 110, as appropriate for a given implementation. Further, the core processing module 200 may provide different and complementary processing of automated creation, processing, augmentation, and management of hybrid object trees that preserve and handle native data in association with each implementation, as described in more detail below.

As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100, such as between any of the computing device_1 102 through the computing device_N 104, to perform operations in association with hybrid object trees. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208.

The communication module 208 may also form a portion of other circuitry described without departure from the scope of the present subject matter.

A memory 210 includes a hybrid object tree storage area 212 that stores hybrid object trees and related management and control processing information for the core processing module 200. As will be described in more detail below, the hybrid object trees and supporting information stored within the hybrid object tree storage area 212 is used to create, process, augment, and manage hybrid object trees that preserve and handle native data. The hybrid object tree storage area 212 may further include one or more object caches for cache management of objects from one or more hybrid object trees, respectively, in association with the present subject matter. As such, objects from different object caches may be combined either from different caches within a single computing device or from different caches of different computing devices, as appropriate for a given implementation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A hybrid object tree processing module 214 is also illustrated. The hybrid object tree processing module 214 provides processing capabilities associated with hybrid object trees for the core processing module 200, as described above and in more detail below. The hybrid object tree processing module 214 implements the automated creation, processing, augmentation, and management of hybrid object trees that preserve and handle native data of the core processing module 200.

Though the hybrid object tree processing module 214 is illustrated as a component-level module for ease of illustration and description purposes, it should be noted that the hybrid object tree processing module 214 may include any hardware, programmed processor(s), and memory used to carry out the functions of this module as described above and in more detail below. For example, the hybrid object tree processing module 214 may include additional controller circuitry in the form of application specific integrated circuits (ASICs), processors, and/or discrete integrated circuits and components for performing communication and electrical control activities associated with the respective devices. Additionally, the hybrid object tree processing module 214 may include interrupt-level, stack-level, and application-level modules as appropriate. Furthermore, the hybrid object tree processing module 214 may include any memory components used for storage, execution, and data processing for performing processing activities associated with the module.

It should also be noted that the hybrid object tree processing module 214 may form a portion of other circuitry described without departure from the scope of the present subject matter. Further, the hybrid object tree processing module 214 may alternatively be implemented as an application stored within the memory 210. In such an implementation, the hybrid object tree processing module 214 may include instructions executed by the CPU 202 for performing the functionality described herein. The CPU 202 may execute these instructions to provide the processing capabilities described above and in more detail below for the core processing module 200. The hybrid object tree processing module 214 may form a portion of an interrupt service routine (ISR), a portion of an operating system, a portion of a browser application, or a portion of a separate application without departure from the scope of the present subject matter.

The database 112 is also shown associated with the core processing module 200 within FIG. 2 to show that the database 112 may be coupled to the core processing module 200 without requiring external connectivity, such as via the network 106.

The CPU 202, the display 204, the input device 206, the communication module 208, the memory 210, the hybrid object tree processing module 214, and the database 112 are interconnected via an interconnection 216. The interconnection 216 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that the database information (DB Info) stored within the database 112 may also or alternatively be stored within the memory 210 without departure from the scope of the present subject matter. Accordingly, the core processing module 200 may take many forms and may be associated with many platforms.

Figure 3:
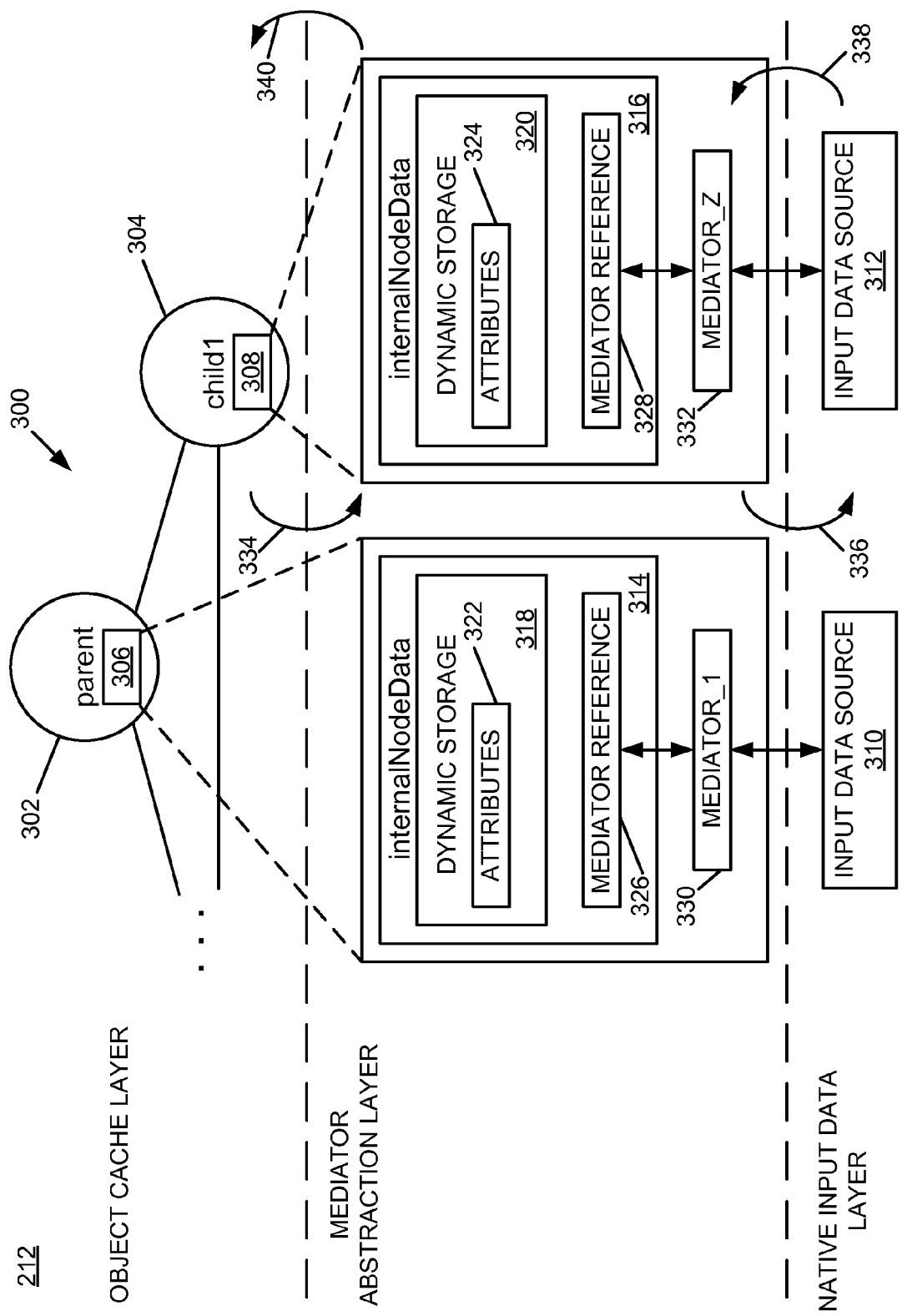
FIG. 3 is a logical block diagram of an example of an implementation of abstraction layers within a hybrid object tree implemented as a data structure of nodes/objects within a memory according to an embodiment of the present subject matter.

FIG. 3 is a logical block diagram of an example of an implementation of abstraction layers within a hybrid object tree 300 implemented as a data structure of nodes/objects within a memory, represented within the present example by the hybrid object tree storage area 212 of the memory 210. As can be seen from FIG. 3, the hybrid object tree 300 includes a parent node 302 and a child1 node 304. The ellipsis dots to the left of FIG. 3 illustrate that additional nodes may be added to the hybrid object tree 300 and may then form a portion of the hybrid object tree 300 over time. The instances of the parent node 302 and the child1 node 304 represent an object cache layer of the hybrid object tree 300. As described above and in more detail below, nodes such as the parent node 302 and the child1 304 have attributes added or changed and behavior of the respective nodes may be changed without invalidating any caches based on particular object instances. It should further be noted that the objects of the hybrid object tree 300 may be physically located/instantiated within different cache management regions within the hybrid object tree storage area 212 or within memories of other devices without departure from the scope of the present subject matter.

The parent node 302 and the child1 node 304 include a dynamic data area 306 and 308, respectively. The dynamic data area 306 and the dynamic data area 308 represent a mediator abstraction layer within the parent node 302 and the child1 node 304, respectively. The mediator abstraction layer interfaces with a native input data layer to access data within an input data source 310 and an input data source 312 for the parent node 302 and the child1 node 304, respectively.

The mediator abstraction layer is responsible for building an internalNodeData 314 and an internalNodeData 316 for the parent node 302 and the child1 node 304, respectively. The mediator abstraction layer is also responsible for responding to data requests by accessing input data as appropriate for the particular type of input data. For example, the mediator abstraction layer may populate, skip, or copy data from an input source or perform other operations as appropriate for the particular input data source.

The internalNodeData 314 and the internalNodeData 316 each include a dynamic storage area 318 and a dynamic storage area 320, respectively. The dynamic storage area 318 and the dynamic storage area 320 include attributes 322 and attributes 324, respectively. As described above, attributes may be added to or removed from nodes without replacing the node and without invalidating the node within the respective object cache. The attributes 322 and the attributes 324 provide an in-cache memory location that may be updated without disrupting references to the respective objects within the respective cache(s).

The internalNodeData 314 and the internalNodeData 316 also include a mediator reference 326 and a mediator reference 328, respectively. The mediator reference 326 and the mediator reference 328 are dynamically configurable and allow a data type associated with a particular object to be changed, again without replacing the node, without invalidating the node within the respective object cache, and without disrupting references to the respective objects within the respective cache(s).

Within the present example, the mediator reference 326 and the mediator reference 328 reference a mediator_1 330 and a mediator_Z 332, respectively. The mediator_1 330 and the mediator_Z 332 reference the input data source 310 and the input data source 312 for the parent node 302 and the child1 node 304, respectively. As with other aspects of the nodes/objects within the hybrid object tree 300, the associations of the mediator_1 330 and the mediator_Z 332 with the parent node 302 and the child1 node 304 may be changed dynamically. Additionally, the associations of the input data source 310 and the input data source 312 for the parent node 302 and the child1 node 304 may also be changed. The respective changes are managed within the mediator abstraction layer of the parent node 302 and the child1 node 304 by changing associations within the dynamic data area 306 and the dynamic data area 308, again without disrupting the cached object or associations to the cached object, and without invalidating the objects in the object cache(s).

Within the present example, an arrow 334 logically represents a request from the object cache layer to the mediator abstraction layer within the hybrid object tree 300, such as a request to navigate into a lazy region of the child1 node 304 by the parent node 302. An arrow 336 represents propagation of the request to navigate into the lazy region the child1 node 304 to the input data source 312 by the mediator_Z 332 responsive to the request initiated by the parent node 302. As such, the dynamically associated mediator_Z 332 requests the appropriate data to fulfill the request (e.g., bytes of data, schema information, etc.) and the actual data access is abstracted through the mediator. As described above, for purposes of the present example, the input data source 312 is stored within the same hybrid object tree storage area 212 of the memory 210 as the hybrid object tree 300. However, as also described above, the input data source 312 may be stored within a different memory storage device, such as the database 112, without departure from the scope of the present subject matter.

An arrow 338 represents a return of the requested data by the input data source 312 to the mediator_Z 332 within the mediator abstraction layer of the child1 node 304. An arrow 340 represents a return of the requested data to the object cache layer of the child1 304, which may then propagate to the requesting parent node 302. As such, the hybrid object tree 300 provides for dynamic configurability of input data sources and input data types, and additionally provides for dynamic attribute storage for cached objects within the hybrid object tree 300 without disrupting the cached object or associations to the cached object, and without invalidating the objects in the object cache(s). Many other variations are possible with respect to the dynamic nature of the hybrid object trees described herein and all are considered within the scope of the present subject matter.

FIG. 4A through FIG. 4D described below represent one example of creation and augmentation of a hybrid object tree from different data sources using native original input data and data access methods. Many other possibilities exist for processing associated with hybrid object trees that preserve and handle native data and all are considered within the scope of the present subject matter.

Figure 4A:
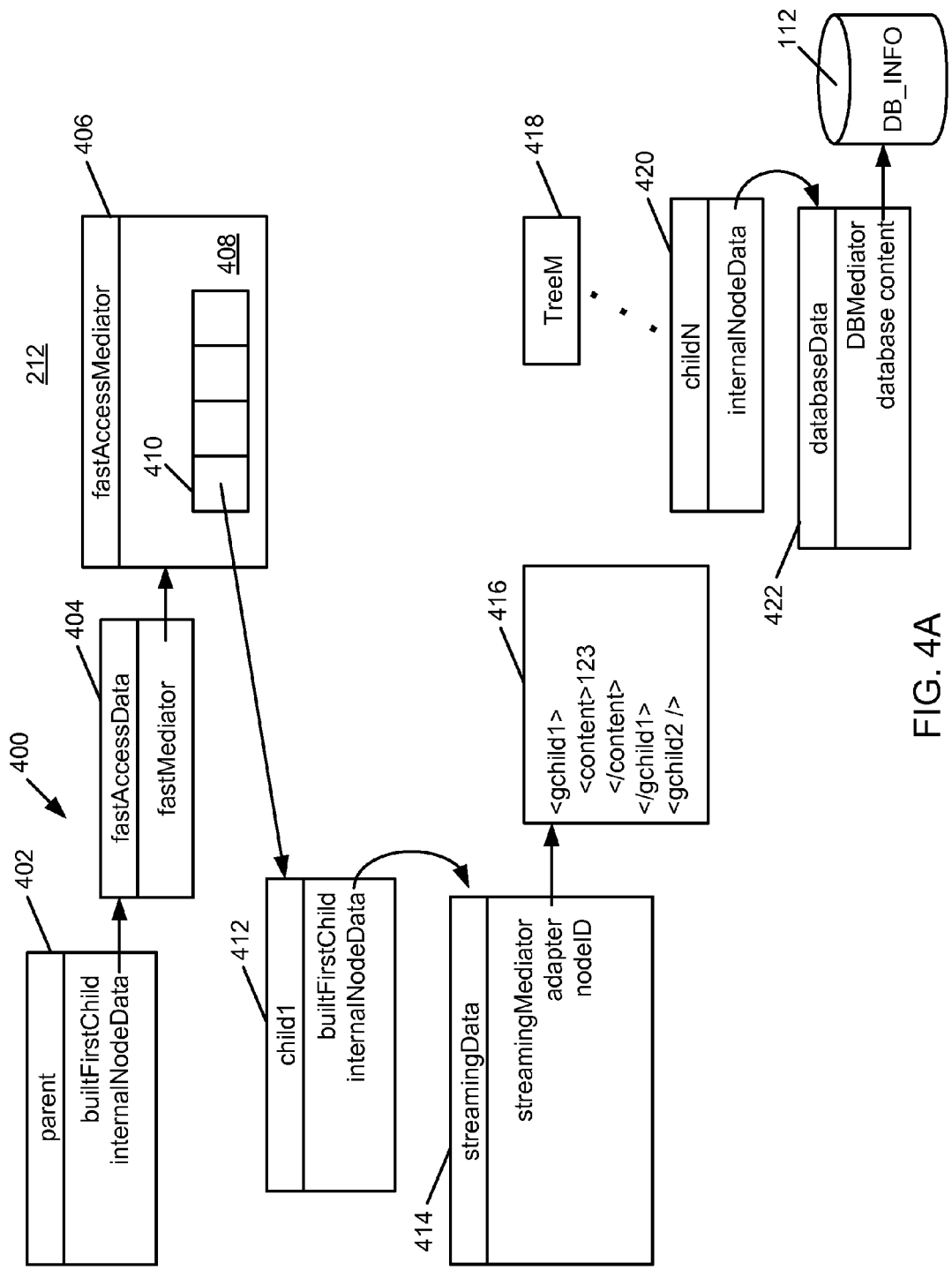
FIG. 4A is a block diagram of an example of an implementation of a first state of a hybrid object tree implemented as a data structure of nodes/objects within a memory to illustrate example processing for automated creation, processing, augmentation, and management of hybrid object trees according to an embodiment of the present subject matter.

FIG. 4A is a block diagram of an example of an implementation of a first state of a hybrid object tree 400 implemented as a data structure of nodes/objects within a memory to illustrate example processing for automated creation, processing, augmentation, and management of hybrid object trees that preserve and handle native data. For purposes of the present sequence of examples associated with the hybrid object tree 400, it is assumed that all data objects/nodes are instantiated within one or more object cache domains within the hybrid object tree storage area 212 of the memory 210. Additionally, it is understood that the database 112 is shown within the present examples as being stored within the hybrid object tree storage area 212 of the memory 210 to avoid additional clutter that would result from showing another memory storage area of another device, a network connect, and other interconnections of components.

The following first example pseudo syntax represents an initial/first state of a hybrid object tree formed that includes a node "parent" according to the present subject matter that is to be augmented within the present example. The following first example pseudo syntax also shows a separate hybrid object tree, "TreeM," represented as a separate tag pair. It should be noted that the following the first pseudo syntax represents what an extensible markup language (XML) document, as represented by the first state of a hybrid object tree 400 within FIG. 4A, would look like if the hybrid object tree 400 were to serialize (e.g., written) to a storage device (e.g., a disk or other memory storage device).

```
<parent>
    <child1>
        <gchild1>
            <content>123
            </content>
        </gchild1>
        <gchild2 />
    </child1>
</parent>
<TreeM>
...
    <childN>...database content...</childN>
</TreeM>
```

As can be seen from the first example pseudo syntax above, the parent tag air includes a "child1" tag pair, a first grandchild "gchild1" tag pair, and a second grandchild "gchild2" tag. The grandchildren nodes gchild1 and gchild2 include content that may be lazily accessed within the present example. It should further be noted that the parent tag pair may represent a tag pair within a larger tree or may represent a highest tag pair without departure from the scope of the present example.

Referring to FIG. 4A, the first example pseudo syntax above is illustrated within the hybrid object tree 400. A parent object 402 represents a node within the hybrid object tree 400, and represents the "parent" tag pair within the first example pseudo syntax above. As noted above, it is understood that the example parent object 402 may be a top node or any other node within the hybrid object tree 400. The parent object 402 includes a "builtFirstChild" field. The "builtFirstChild" field is a native field of nodes that contain children, and is useful to show a "lazy-loading" aspect of the internalNodeData architecture described herein. As such, a node can have one or more children that are still in their native format (e.g., in streaming bytes), but that have not yet been materialized into a full node. As such, the link "builtFirstChild" is initially null/empty. For nodes that do not have children (e.g., eager or lazy children), the "builtFirstChild" field may be omitted. The "internalNodeData" field of the parent object 402 represents a location for dynamic storage of attributes, mediator references, etc., as described above and in more detail below.

Within the example parent object 402, the internalNodeData field references a "fastAccessData" element 404. The fastAccessData element 404 represents a reference to a typed mediator for the parent object 402. The fastAccessData element 404 of the internalNodeData for the parent object 402 identifies/references a fastAccessMediator 406. The fastAccessMediator 406 is a typed mediator that allows direct access to data stored in its native format. The fastAccessMediator 406 includes an array 408 of element references. As described in more detail below, the array 408 may include pointer-type object references to other instantiated data objects or discrete data values that store data for child nodes of the parent object 402. As such, a child node that may be represented as a discrete data value may be added to the parent object 402 without instantiating a separate child object to encapsulate the data referenced by the respective child node.

As can be seen from FIG. 4A, the array 408 initially includes only a first object reference 410 that references a child1 object 412. Additional references within the array 408 may be added as elements are added to the parent object 402. As such, the fast access mediator provides a dynamic object addition/augmentation capability for the parent object 402 without requiring a separate object to be instantiated to reference or access the added objects. It should additionally be noted that as other/additional nodes are added to the parent object 402, the array 408 allows each node to be individually referenced even if nested below a child node. As such, the array 408 may return a direct pointer to any node below the parent object 402 to allow rapid navigation to the respective node without having to navigate each node within the node hierarchy to arrive at the respective node.

The child1 object 412 represents the "child1" tag pair within the first example pseudo syntax above. As such, for purposes of the present example, it is assumed that the child1 object 412 is instantiated within the hybrid object tree 400 and that the builtFirstChild field of the parent object 402 references the name "child1" as the first built child of the parent object 402.

The child1 object 412 also includes a builtFirstChild field and an internalNodeData field. The internalNodeData field of the child1 object 412 references a streamingData mediator 414. The association of the streamingData mediator 414 with the child1 object 412 shows that the data type of the child1 object 412 is of type "streamingData" initially.

The streamingData mediator 414 includes a streamingMediator reference field, an adapter field, and a nodeID field. These are considered as defined fields within the streamingData mediator type definition. The adapter field references extensible markup language (XML) content 416 that represents the content of the "gchild1" and "gchild2" tag pairs within the first example pseudo syntax above.

It should be noted for purposes of the present example that the streamingData mediator 414 does not include any references to schema verification data (e.g., has no XML schema element declaration (XSElementDecl), post schema validation infoset (PSVI), or base uniform resource identifier (baseURI) fields). As such, the child1 object 412 does not include verification data within the first state of the hybrid object tree 400 represented within FIG. 4A. This aspect of the child1 object 412 will be changed by augmentation of the child1 object 412 within the instantiated hybrid object tree 400, as described in more detail below. It should further be noted that data fields for schema verification data are not wasted if all nodes are not to be configured to provide these fields, and these fields may be dynamically added as used, which dynamically converts the node type as well.

A "TreeM" 418 represents the separate hybrid object tree "TreeM" within the first example pseudo syntax above. The TreeM 418 is shown to include a "childN" node 420 that has an internalNodeData field that references a databaseData mediator 422 of type "DBMediator" that references database content within the database 112. As such, the childN node 420 is of a different data type from the child1 object 412 of the hybrid object tree 400.

It is understood that the TreeM 418 may be stored within the same memory storage area or a different memory storage area, as appropriate for a given implementation. For purposes of the present example, it is assumed that the TreeM 418 is stored within the hybrid object tree storage area 212 of the memory 210 to avoid clutter within the drawing figures that would result by additional illustration of another memory storage area of another device, a network connect, and other interconnections of components. However, it is understood that the present subject matter may be implemented across multiple devices and multiple cache management domains without departure from the scope of the present subject matter. Additionally, the present example assumes that the TreeM 418 is associated with a different cache management domain within the hybrid object tree storage area 212 of the memory 210.

Figure 4B:
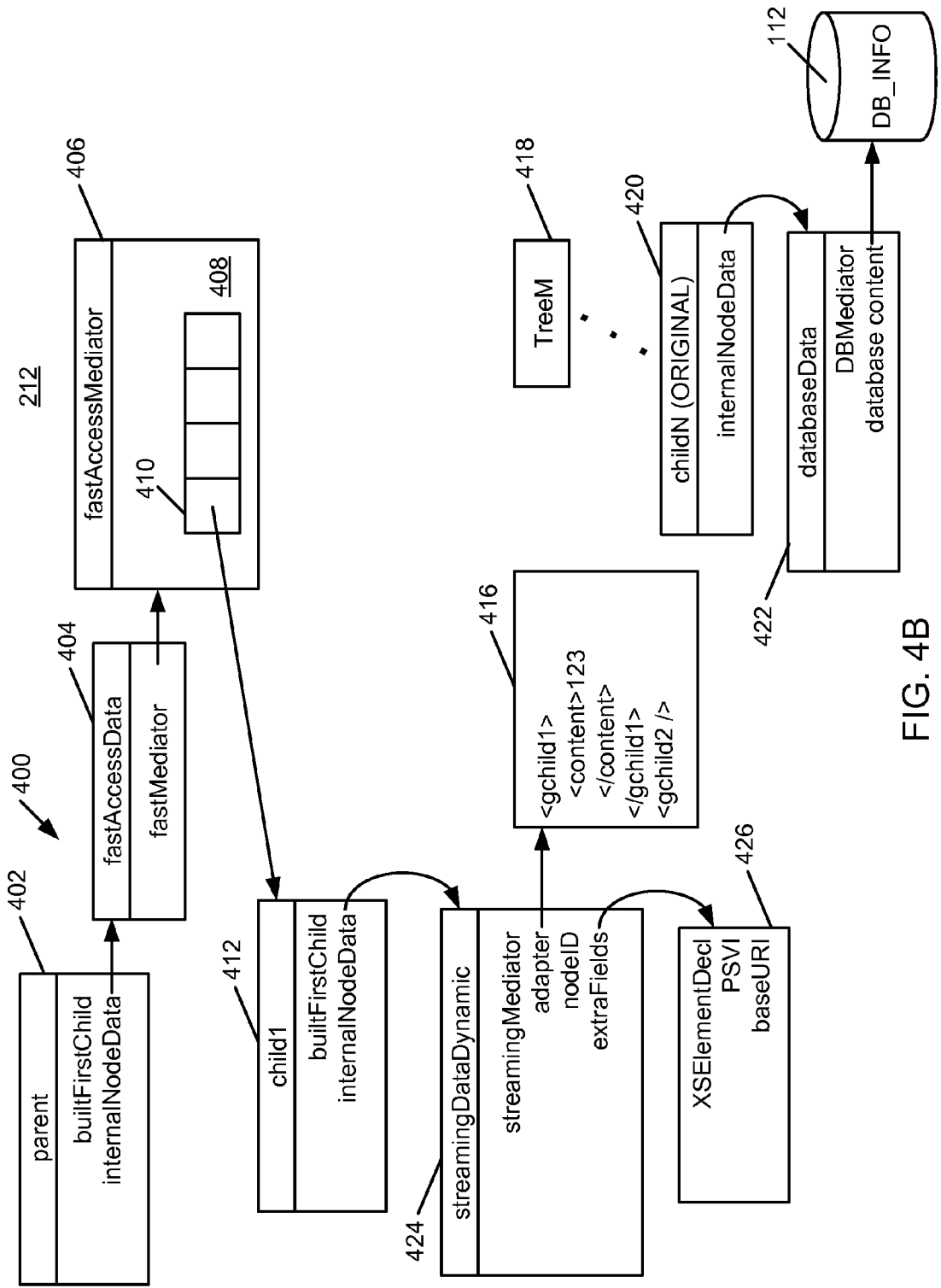
FIG. 4B is a block diagram of an example of an implementation of a second state of the hybrid object tree of FIG. 4A implemented as a data structure of nodes/objects within a memory to illustrate example processing for automated creation, processing, augmentation, and management of hybrid object trees according to an embodiment of the present subject matter.

FIG. 4B is a block diagram of an example of an implementation of a second state of the hybrid object tree 400 of FIG. 4A implemented as a data structure of nodes/objects within a memory to illustrate example processing for automated creation, processing, augmentation, and management of hybrid object trees that preserve and handle native data. For purposes of the present example, it is assumed that the parent object 402 initiated a verification operation on the child1 object 412. As can be seen from FIG. 4B, the streamingData mediator 414 has been changed to a "streamingDataDynamic" mediator 424 to accommodate the addition of verification data to the existing child1 object 412 without removing, replacing, or invalidating the child1 object 412 within the object cache in the hybrid object tree storage area 212 of the memory 210. The streamingDataDynamic mediator 424 includes an additional data field called "extra fields." This additional data field references additional data to support verification of the child1 object 412. It should be noted that this verification data was not a part of the original child1 object 412 when instantiated into the hybrid object tree 400. As such, the child1 object 412 has been augmented within the existing object cache. Additional verification data 426 is referenced by the extra fields identifier in the streamingDataDynamic mediator 424, and includes schema verification data (e.g., XSElementDecl, PSVI, and baseURI fields) that has been dynamically added to the child1 object 412. It should be noted that this verification data is used in-memory and does not need to be represented within XML code once the in-memory child1 object 412 is serialized (e.g., written) to a storage device (e.g., a disk or other memory storage device).

It should be noted that the childN object 420 is still associated with the treeM 418 within the second state of the present example. As described in more detail below, the childN object 420 may be dynamically associated with the parent object 402.

Figure 4C:
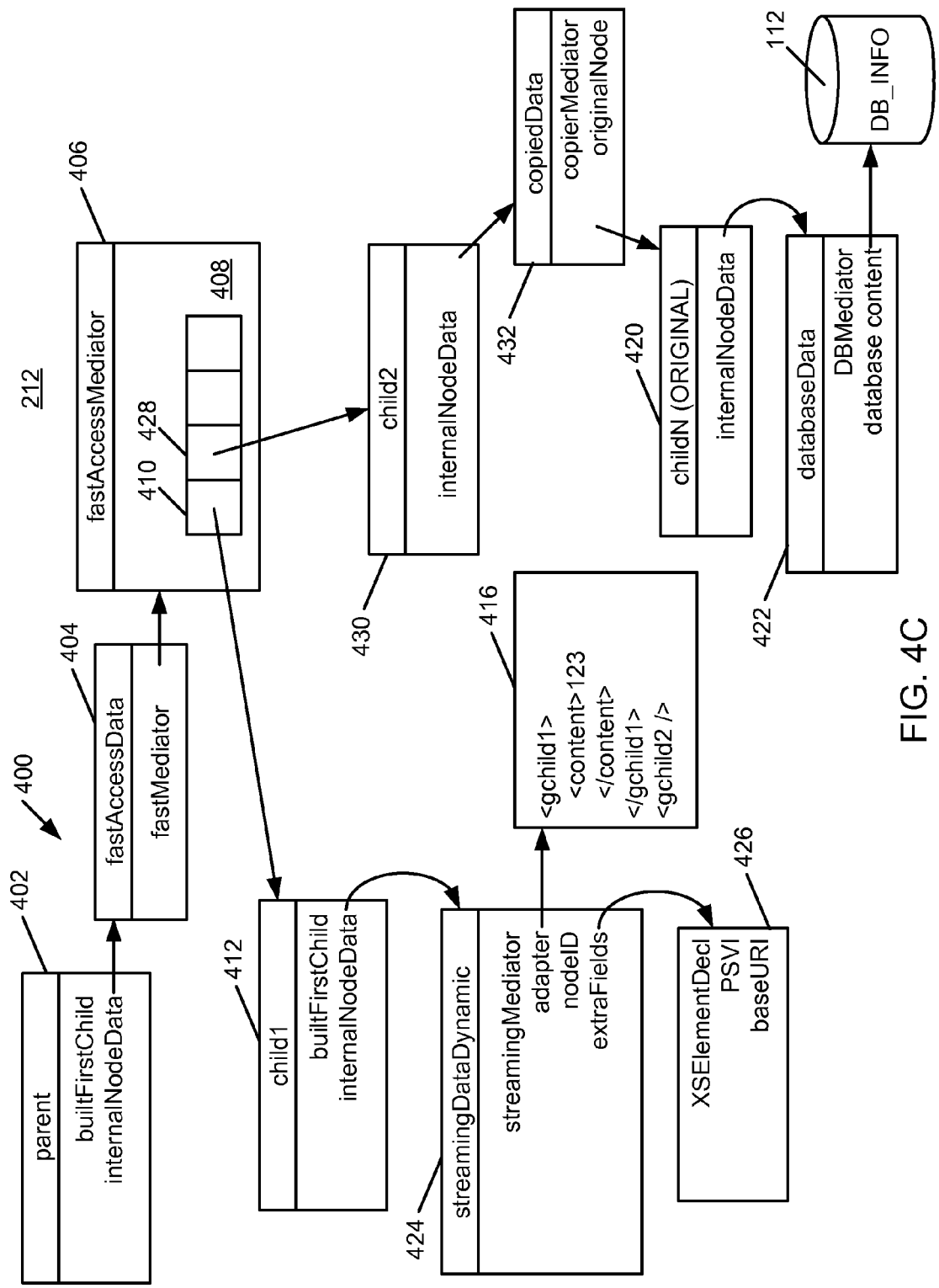
FIG. 4C is a block diagram of an example of an implementation of a third state of the hybrid object tree of FIG. 4A and FIG. 4B implemented as a data structure of nodes/objects within a memory to illustrate example processing for automated creation, processing, augmentation, and management of hybrid object trees according to an embodiment of the present subject matter.

FIG. 4C is a block diagram of an example of an implementation of a third state of the hybrid object tree 400 of FIG. 4A and FIG. 4B implemented as a data structure of nodes/objects within a memory to illustrate example processing for automated creation, processing, augmentation, and management of hybrid object trees that preserve and handle native data. Within the third state of the hybrid object tree 400, a copy of the childN object 420 has been added to the parent object 402. As can be seen from FIG. 4C, an object reference 428 of the array 408 within the fastAccessMediator 406 has been populated with a reference to a "child2" object 430 that includes internalNodeData that references a "copiedData" mediator 432 of type "copierMediator" in response to the fastAccessMediator 406 creating the child2 object 430.

For purposes of the present example, it is assumed that the copiedData mediator 432 is of a copy-on-write type to copy a bare minimum of a referenced object to conserve space at the time of the initial copy and association with another hybrid object tree. The internalNodeData may be copied as requested from the original childN object 420. As such, the copiedData mediator 432 represents an abstraction layer so that the original childN object 420 data is abstracted.

The copiedData mediator 432 references the original childN object 420 within the TreeM 418 (omitted from the present figure to reduce clutter within the drawing figure). As such, a copy of the childN object 420 has been dynamically added to the parent object 402 from a different hybrid object tree without invalidation of the parent object 402 within the object cache. Further, as noted above, for purposes of the present example, the childN object 420 is assumed to be managed within a separate object management cache. As such, the copy of the childN object 420 has been dynamically added from a separate cache management domain to the parent object 402, as represented by the child2 object 430. Additionally, the childN object 420 is of type databaseData, which is different from the type of both the parent object 402 and the child1 object 412 within the hybrid object tree 400.

The following second example pseudo syntax shows an example representation of the first example pseudo syntax above with the child2 object 430 added as a tag pair within the second example pseudo syntax.

```
<parent>
    <child1>
        <gchild1>
            <content>123
            </content>
        </gchild1>
```

```
            <gchild2 />
        </child1>
        <child2>...database content...</child2>
    </parent>
```

As can be seen from the second example pseudo syntax above, the child2 tag pair has been added to the parent tag pair as a child node of the parent node and references database content. The TreeM tag pair of the separate hybrid object tree is not shown, though as noted above, the child2 tag pair references the original node within the TreeM hybrid object tree.

Figure 4D:
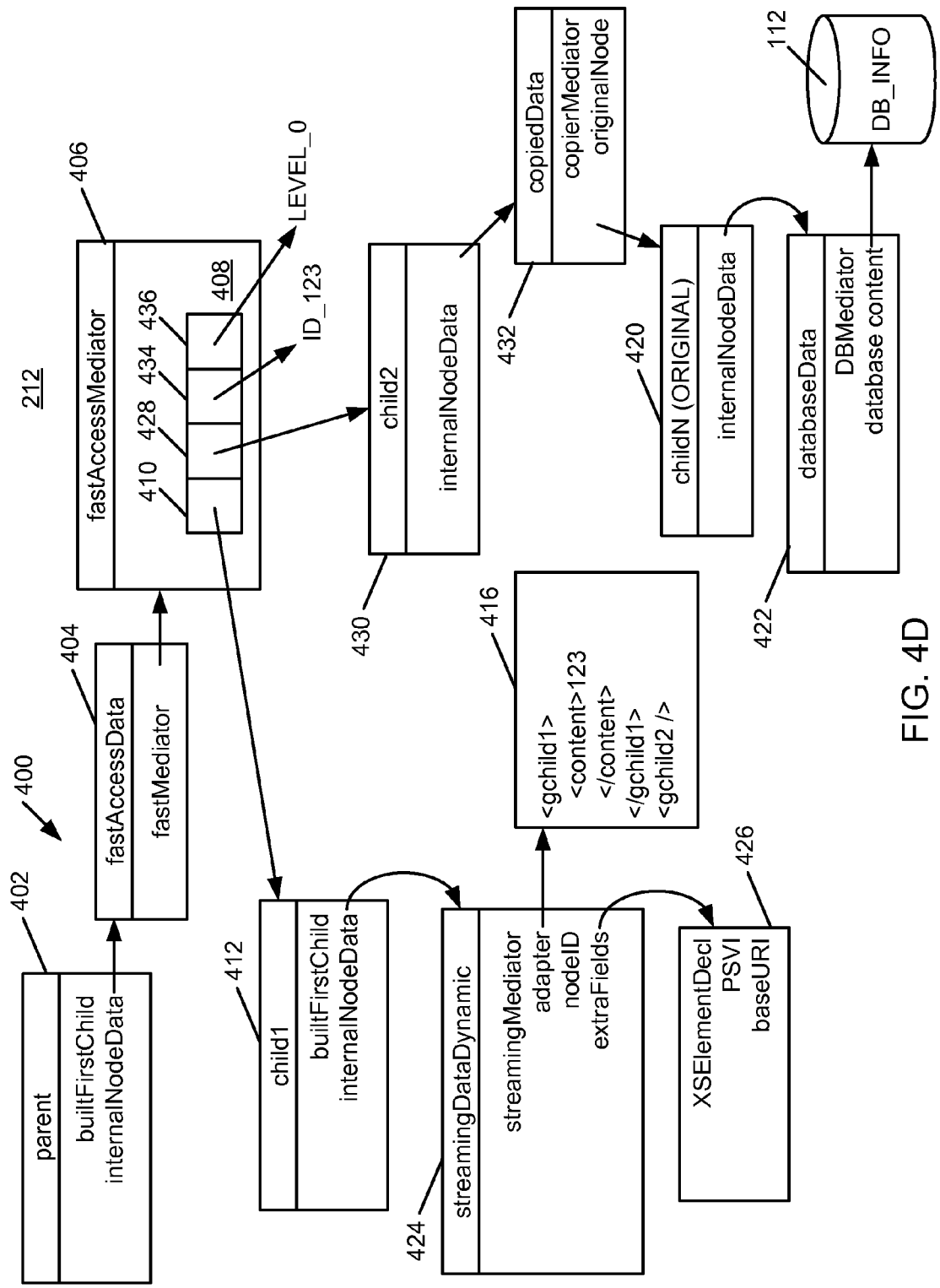
FIG. 4D is a block diagram of an example of an implementation of a fourth state of the hybrid object tree of FIG. 4A through FIG. 4C implemented as a data structure of nodes/objects within a memory to illustrate example processing for automated creation, processing, augmentation, and management of hybrid object trees according to an embodiment of the present subject matter.

FIG. 4D is a block diagram of an example of an implementation of a fourth state of the hybrid object tree 400 of FIG. 4A through FIG. 4C implemented as a data structure of nodes/objects within a memory to illustrate example processing for automated creation, processing, augmentation, and management of hybrid object trees that preserve and handle native data.

The following third example pseudo syntax shows an example representation of the second example pseudo syntax above with two new additional nodes/tag pairs added to the second example pseudo syntax.

```
    <parent>
        <child1>
            <gchild1>
                <content>123
                </content>
            </gchild1>
            <gchild2 />
        </child1>
        <child2>...database content...</child2>
        <child3>ID__123</child3>
        <child4>LEVEL__0</child4>
    </parent>
```

As can be seen from the third example pseudo syntax above, a "child3" tag pair and a "child4" tag pair have been added to the second example pseudo syntax described above. The child3 tag pair includes a discrete data value "ID__123" and the child4 tag pair includes a discrete data value "LEVEL__0."

Referring to FIG. 4D, the values represented by the child3 tag pair and the child4 tag pair have been added to the parent object 402 without creating or instantiating separate data objects. These values have been added to the array 408 as discrete data values, as shown by an object reference 434 and an object reference 436, respectively. As such, additional child nodes have been added to the parent node 402 of the hybrid object tree 400 without having to materialize (e.g., instantiate) additional data objects/nodes, without having to eagerly attach those nodes to the parent, and without invalidating any node of the hybrid object tree 400 within the object cache. Accordingly, child nodes represented as discrete data values may be added to the parent node 402 without instantiating a separate child object to encapsulate the data referenced by the respective child nodes.

Figure 5:
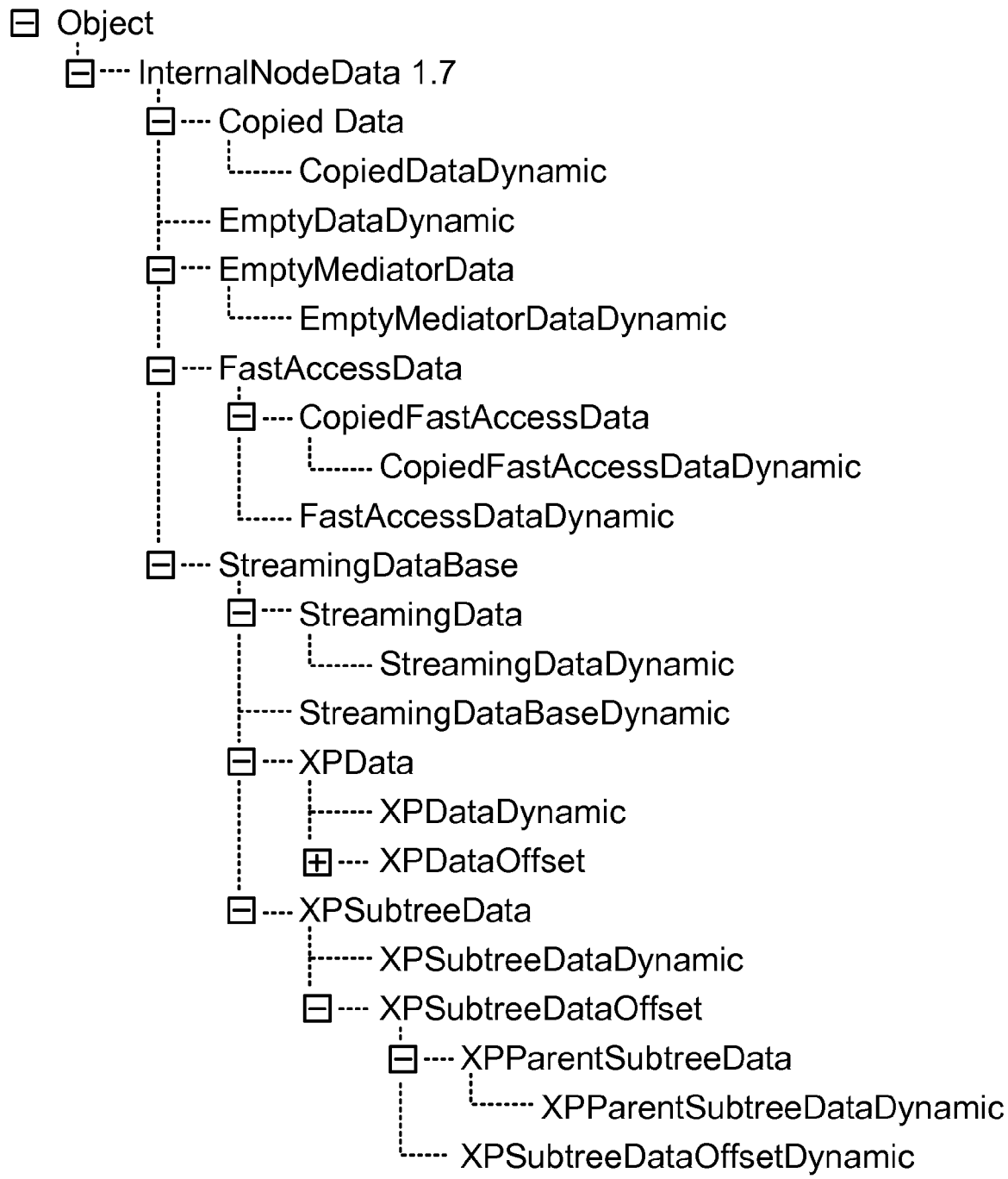
FIG. 5 is a diagram of an example of an implementation of an object hierarchy that includes hierarchical selections of internalNodeData usable for automated creation, processing, augmentation, and management of hybrid object trees according to an embodiment of the present subject matter.

FIG. 5 is a diagram of an example of an implementation of an object hierarchy 500 that includes hierarchical selections of internalNodeData usable for automated creation, processing, augmentation, and management of hybrid object trees that preserve and handle native data. As can be seen from FIG. 5, an "Object" at a highest level of hierarchy within a hybrid object tree includes "InternalNodeData." The internalNodeData is capable of being typed according to a native original data source. As such, "CopiedData," "EmptyDataDynamic," "EmptyMediatorDynamic," "FastAccessData," and "StreamingDataBase" form a first level of hierarchy within the example object hierarchy 500.

Each of the first-level hierarchical possibilities for creation of internalNodeData may be further refined by the elements shown within FIG. 5 for each of the first-level hierarchical possibilities. Reference is made to FIG. 5 for specific details of the options presented.

A CopiedData element represents an internalNodeData type optimized for making copies of another node. This functionality includes keeping track of the original node and other artifacts that receive notifications of changes made in the original node. An EmptyMediatorData element is used by nodes that include a self-contained mediator. A self-contained mediator does not need any additional native data to be stored in the internalNodeData. The FastAccessData element, as illustrated by the previous examples, allows for direct storage and retrieval of native data without inflating objects or going through standard tree navigation. A CopiedFastAccessData element combines the FastAccessData and the CopiedData type capabilities that may be used in a scenario of fast accessing for copied values. The various subclasses of the StreamingDataBase element demonstrate that internalNodeData may be finely tuned for specific situations, such as handling nodes that have been skipped and that include a subtree region. The nesting of StreamingDataBase types allows for a shared implementation of commonly used fields for all streaming-based data, such as an original stream of bytes. All of the represented internalNodeData elements from FIG. 5 also include a "dynamic" version, which is triggered in response to dynamic addition of a non-native attribute during runtime (e.g., by a user via a computing device).

As such, an object may be instantiated that includes internalNodeData that encapsulates a data type representative of a native data source. Many other possible data types exist and all are considered within the scope of the present subject matter.

Figure 6:
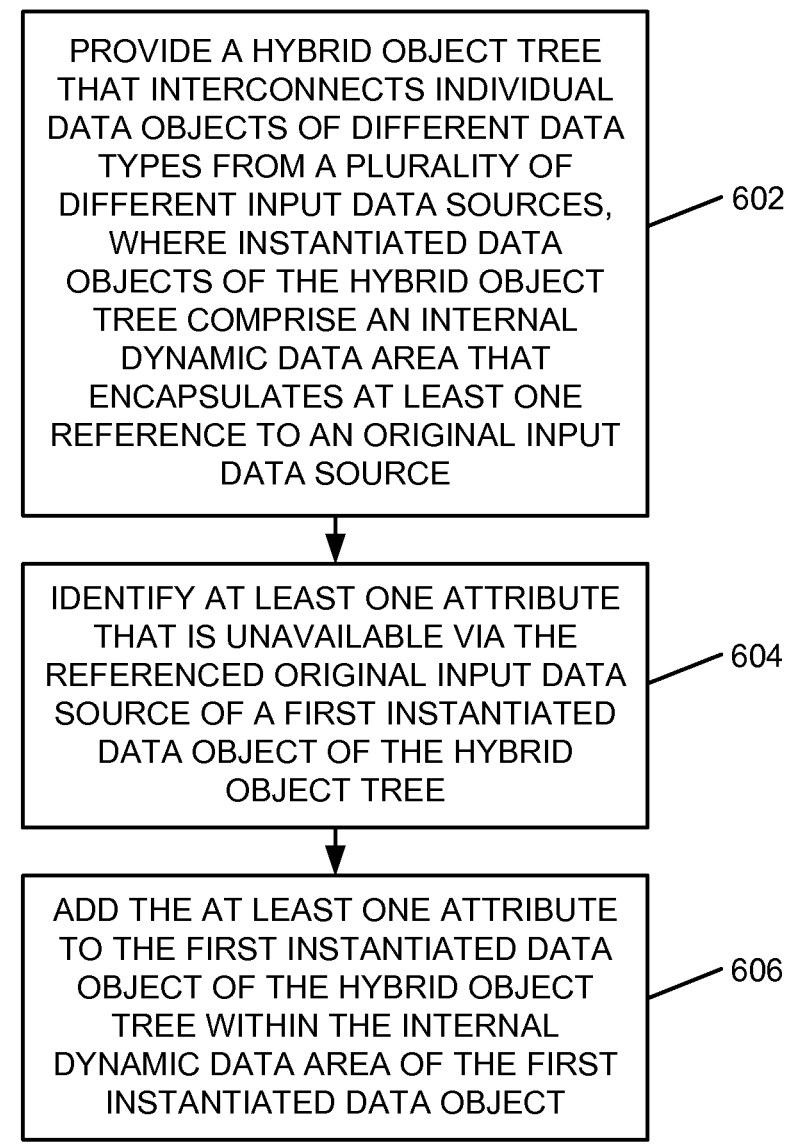
FIG. 6 is a flow chart of an example of an implementation of a process for automated creation, processing, augmentation, and management of hybrid object trees according to an embodiment of the present subject matter.
Figure 7:
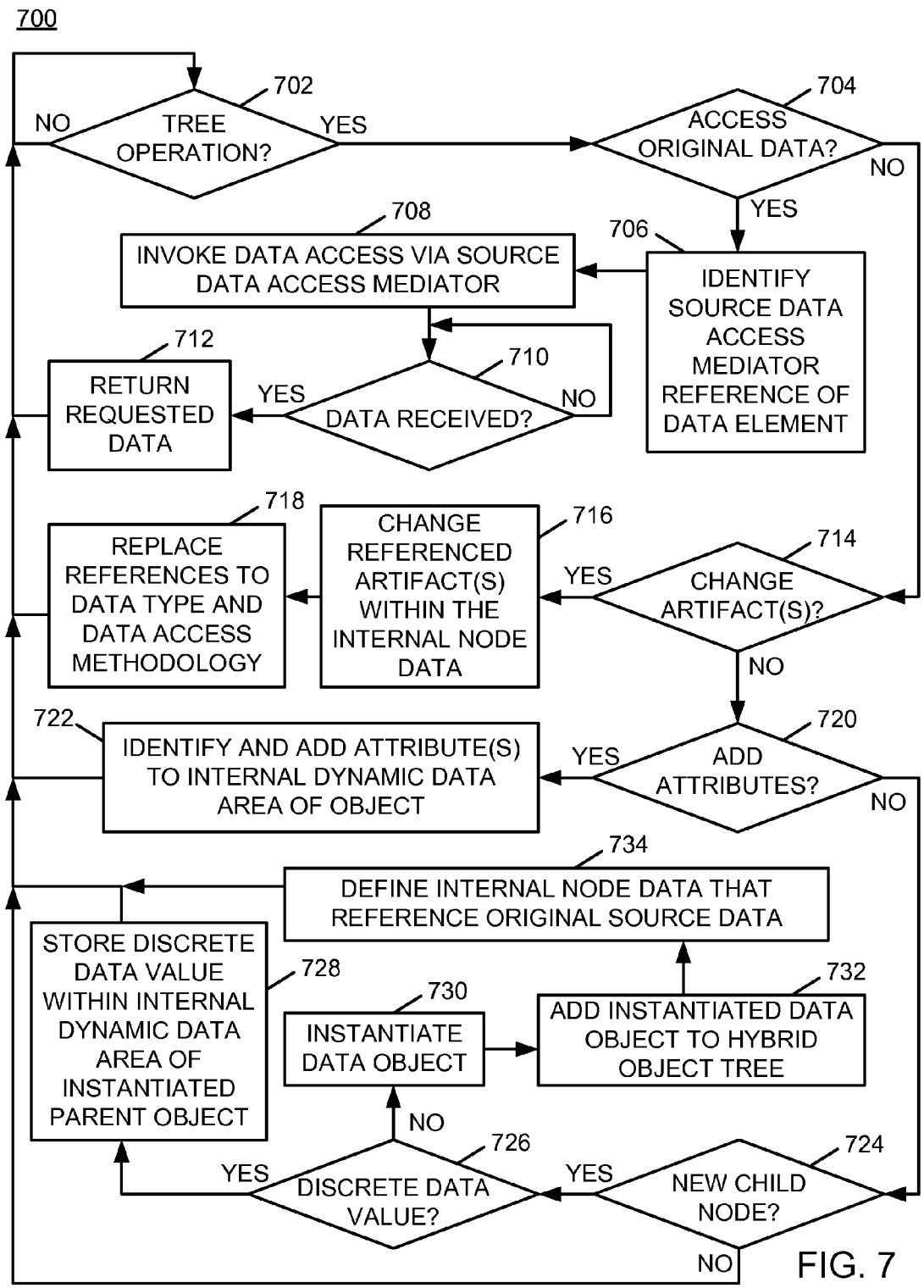
FIG. 7 is a flow chart of an example of an implementation of a process for automated creation, processing, augmentation, and management of hybrid object trees according to an embodiment of the present subject matter.

FIG. 6 through FIG. 7 described below represent example processes that may be executed by devices, such as the core processing module 200, to perform the automated creation, processing, augmentation, and management of hybrid object trees that preserve and handle native data associated with the present subject matter. Many other variations on the example processes are possible and all are considered within the scope of the present subject matter. The example processes may be performed by modules, such as the hybrid object tree processing module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

FIG. 6 is a flow chart of an example of an implementation of a process 600 for automated creation, processing, augmentation, and management of hybrid object trees that preserve and handle native data. At block 602, the process 600 provides a hybrid object tree that interconnects individual data objects of different data types from a plurality of different input data sources, where instantiated data objects of the hybrid object tree comprise an internal dynamic data area that encapsulates at least one reference to an original input data source. At block 604, the process 600 identifies at least one attribute that is unavailable via the referenced original input data source of a first instantiated data object of the hybrid object tree. At block 606, the process 600 adds the at least one attribute to the first instantiated data object of the hybrid object tree within the internal dynamic data area of the first instantiated data object.

FIG. 7 is a flow chart of an example of an implementation of a process 700 for automated creation, processing, augmentation, and management of hybrid object trees that preserve and handle native data. At decision point 702, the process 700 makes a determination as to whether a hybrid object tree operation has been detected. For example, a modification of syntax that represents a hybrid object tree, such as one of the modifications to the example pseudo syntax described above, may be detected. Alternatively, an operational request to access original source data or to change the source data associated with an instantiated object within a hybrid object tree may be detected.

In response to determining that a hybrid object tree operation has been detected, the process 700 makes a determination at decision point 704 as to whether the detected hybrid object tree operation was a request to access original source data. It is understood that such a request may be generated via a parent object of a hybrid object tree to request data from a child object. As such, the process 700 may receive, at an instantiated child object within the hybrid object tree, a data access request from an instantiated parent object that identifies a data element of the instantiated child object.

In response to determining that the detected hybrid object tree operation was a request to access original source data, the process 700 identifies the source data access mediator reference within the internal dynamic data area of the instantiated child object associated with the data element of the instantiated child object at block 706. As described above, the original data source may include a database or other source. At block 708, the process 700 invokes a data access via a source data access mediator identified via the identified source data access mediator reference. At decision point 710, the process 700 makes a determination as to whether the requested data element has been received from the original data source in response to invoking the data access via the source data access mediator. In response to determining that the requested data element has been received from the original data source, the process 700 returns the requested data element to the instantiated parent object at block 712. The process 700 returns to decision point 702 to await another hybrid object tree operation.

Returning to the description of decision point 704, in response to determining that a request to access original source data has not been detected, the process 700 makes a determination at decision point 714 as to whether the detected hybrid object tree operation was a request to change one or more input artifact(s) of the at least one instantiated data object within the hybrid object tree to reference a new input data source. For purposes of the present description, an "internal artifact" represents, for example, a referenced original input data source, a mediator, an extra fields container, or other internal data of internalNodeData. As such, a change of the "input artifact(s)" represents a change to one or more of the data aspects of the internalNodeData. In response to determining that the detected hybrid object tree operation was a request to change one or more input artifact(s), the process 700 changes the referenced one or more input artifact(s) of the at least one instantiated data object within the hybrid object tree to reference a new input data source referenced within the detected request at block 716. At block 718, the process 700 replaces the references to the data type and the data access methodology of the original input data source encapsulated within the internal dynamic data area of the referenced data object to reference a data type and data access methodology of the new input data source while the at least one data object is instantiated within a memory. The process 700 returns to decision point 702 to await another hybrid object tree operation.

Returning to the description of decision point 714, in response to determining that the detected hybrid object tree operation was not a request to change a referenced original input data source, the process 700 makes a determination at decision point 720 as to whether the detected hybrid object tree operation was a request to add attributes to an instantiated object. As described above, a request to add attributes may be generated for a variety of reasons, such as to add attributes that are not part of native original data of a referenced original data source. For example, if a node was originally generated by a non-schema aware parser (e.g., without an element declaration and post schema validation infoset (PSVI)), these attributes may be dynamically added to the internalNodeData of the node, even though its native internalNodeData does not support or manage such fields.

In response to determining at decision point 720 that the detected hybrid object tree operation was a request to add attributes to an instantiated object, the process identifies at least one attribute that is unavailable via the referenced original input data source of the instantiated data object of the hybrid object tree and adds the at least one attribute to the instantiated data object of the hybrid object tree within the internal dynamic data area of the instantiated data object at block 722. It should be noted, as described above, that attributes may be added to the instantiated data object within the internal dynamic data area of the instantiated data object without invaliding the instantiated data object within an object management cache. Further, if the added attributes are validation related, the process 700 may be configured to perform the validation on the instantiated data object. This processing has been omitted to reduce congestion within the drawing figure. However, it is understood that this processing to perform the actual validation may form a portion of a process, such as the process 700, without departure from the scope of the present subject matter. The process 700 returns to decision point 702 to await another hybrid object tree operation.

Returning to the description of decision point 720, in response to determining that the detected hybrid object tree operation was not a request to add attributes to an instantiated object, the process 700 makes a determination at decision point 724 as to whether the detected hybrid object tree operation was a request to add a new child node to a parent node of the hybrid object tree. In response to determining that the detected hybrid object tree operation was a request to add a new child node to a parent node of the hybrid object tree, the process 700 makes a determination at decision point 726 as to whether the child node may be represented as a discrete data value (See FIG. 4D and the description above). In response to determining that the child node may be represented as a discrete data value, the process 700 stores the discrete data value within the internal dynamic data area (e.g., internalNodeData) of the parent node to create the child data node at block 728. As such, the process 700 creates a new child node without instantiating a child data object to store the discrete data value.

Returning to the description of decision point 726, in response to determining that the child node may not be represented as a discrete data value, the process 700 instantiates a new data object within the hybrid object tree at block 730. At block 732, the process 700 adds the new instantiated data object to the hybrid object tree as a child of the appropriate parent node. At block 734, the process 700 defines internal node data within the internal dynamic data area of the instantiated data object that references original source data of the respective data source. It is understood, as described above, that the original data source may include a different source data type relative to a source data type of the instantiated data object. Further, the defined internal node data may reference an original source data type and an original source data access methodology of the original source data within an original storage location accessed via the second instantiated data object. The instantiated data object may further be instantiated within an object management cache associated with the hybrid object tree, while the referenced original source data of the instantiated data object may be located within a different object management cache. Many other variations on instantiation of data objects from original source data are possible and all are considered within the scope of the present subject matter.

In response to completion of either storing the discrete data value within the internal dynamic data area (e.g., internalNodeData) of the parent node to create the child data node at block 728, or completion of defining the internal node data within the internal dynamic data area of the instantiated data object that references original source data of the respective data source at block 734, the process 700 returns to decision point 702 to await another hybrid object tree operation.

As such, the process 700 responds to hybrid tree operations including data accesses to original source data, changes to a data source for an instantiated data object, adding attributes to data objects, and adding child nodes to parent objects. Further, child nodes may be added to internal node data without instantiating a separate in-memory data object where the child node may be referenced as one or more discrete data values. New child nodes may be instantiated to reference original data sources that may reside in other physical devices or object management caches, and internal node data may be defined to reference the original data source, original data type, and original data access methodology.

As described above in association with FIG. 1 through FIG. 7, the example systems and processes provide for preserving and handling native data in hybrid object trees. Many other variations and additional activities associated with preserving and handling native data in hybrid object trees are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   providing a hybrid object tree that interconnects individual data objects of different data types from a plurality of different input data sources, where instantiated data objects of the hybrid object tree comprise an internal dynamic data area that encapsulates at least one reference to an original input data source;
   identifying at least one attribute that is unavailable via the referenced original input data source of a first instantiated data object of the hybrid object tree;
   adding the at least one attribute to the first instantiated data object of the hybrid object tree within the internal dynamic data area of the first instantiated data object;
   detecting a modification to hybrid object tree syntax that defines the hybrid object tree; determining that the detected modification to the hybrid object tree syntax results in a new child node of an instantiated parent data object within the hybrid object tree;
   determining whether data of the new child node comprises a discrete data value; and
   storing, in response to determining that the data of the new child node comprises the discrete data value, the discrete data value within the internal dynamic data area of the instantiated parent data object to create the new child node without instantiating a child data object to store the discrete data value.

2. The method of claim 1, where the at least one reference to the original input data source for at least one instantiated data object comprises a data type and a data access methodology of the original input data source.

3. The method of claim 2, further comprising:
   changing the at least one reference to the original input data source for the at least one instantiated data object within the hybrid object tree to reference a new input data source; and
   replacing the at least one reference to the data type and the data access methodology of the original input data source encapsulated within the internal dynamic data area of the at least one instantiated data object to reference a data type and data access methodology of the new input data source while the at least one data object is instantiated within a memory.

4. The method of claim 1, where adding the at least one attribute to the first instantiated data object of the hybrid object tree within the internal dynamic data area of the first instantiated data object comprises adding the at least one attribute to the first instantiated data object within the internal dynamic data area of the first instantiated data object without invaliding the first instantiated data object within an object management cache.

5. The method of claim 1, further comprising:
   instantiating, in response determining that the data of the new child node does not comprise the discrete data value, a new data object within the hybrid object tree;
   adding the instantiated new data object to the hybrid object tree; and
   defining internal node data within the internal dynamic data area of the instantiated new data object that references original source data of a different source data type relative to a source data type of the first instantiated data object.

6. The method of claim 5, where the first instantiated data object is instantiated within a first object management cache and where the referenced original source data of the instantiated new data object is located within a second object management cache.

7. The method of claim 1, further comprising:
   receiving, at an instantiated child data object within the hybrid object tree, a data access request from an instantiated parent data object that identifies a data element of the instantiated child data object;
   identifying a source data access mediator reference within the internal dynamic data area of the instantiated child data object associated with the data element of the instantiated child data object;
   invoking a data access using a source data access mediator referenced by the identified source data access mediator reference;
   receiving the requested data element in response to invoking the data access via the source data access mediator; and
   returning the requested data element to the instantiated parent data object.

* * * * *